June 26, 1923.    B. R. BENJAMIN    1,460,222

MACHINE KEY

Filed May 26, 1922

Inventor:
Bert R. Benjamin,
By H. P. Doolittle,
Atty.

Patented June 26, 1923.

1,460,222

UNITED STATES PATENT OFFICE.

BERT R. BENJAMIN, OF OAK PARK, ILLINOIS, ASSIGNOR TO INTERNATIONAL HARVESTER COMPANY, OF CHICAGO, ILLINOIS, A CORPORATION OF NEW JERSEY.

MACHINE KEY.

Application filed May 26, 1922. Serial No. 563,961.

*To all whom it may concern:*

Be it known that I, BERT R. BENJAMIN, a citizen of the United States, residing at Oak Park, in the county of Cook and State of Illinois, have invented certain new and useful Improvements in Machine Keys, of which the following is a full, clear, and exact specification.

My invention relates to keys for securing pulleys, sprockets, gears and the like to shafts.

In many classes of machines, notably agricultural implements, sprockets, gears and the like are usually made from cast iron and secured to steel shafts by rectangular keys engaging in keyways formed one-half in the shaft and one-half in the hub of the gear or wheel. Machines of this class must be constructed cheaply so that they may be sold at a price within the reach of the purchaser, hence the keyways are not always cut accurately but vary slightly in depth in both the shaft and the hub. The result is that the key which is square or rectangular, either fits the keyway so loosely that the wheel is not rigid on the shaft, or it fits so tightly that the hub is cracked when the key is driven in. In order to avoid breakage of the hub it has been customary for the workmen to place the tight fitting key in a vice and file it down to such size that it will enter the keyway, but this is objectionable because the key, when so filed, seldom if ever accurately fits the keyway so as to have a bearing throughout its length but bears on the top and bottom only at certain points. This results in the gears or sprockets soon becoming loose on the shaft which makes the machine noisy and inefficient in operation.

The main object of my invention is therefore to provide a machine key that will adapt itself to accurately fit keyways varying slightly in depth without having to be fitted closely by the workmen.

In the drawings to which reference is now made, I have illustrated two forms of a machine key embodying the principles of my invention.

Figure 2:
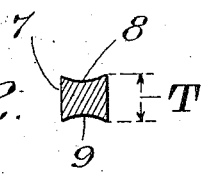

My improved key consists of a rectangular bar of relatively soft steel 7 having grooves 8, 9 on opposite sides extending the full length of the bar and substantially the entire width. The thickness (T, Fig. 2) of the bar is slightly greater than the combined depth of the grooves 10, 11 in the hub 12 and shaft 13 so that when the key is driven in its corners will tightly fit the corners of the keyway, the deformed metal flowing into the shallow grooves 8, 9 and providing good bearings at the four corners of the key throughout its length.

Figure 1:
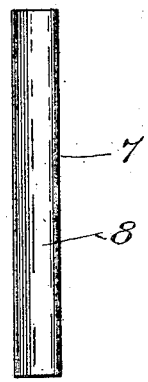
Figs. 1 and 2 are a plan and a cross section respectively of what I now believe to be a preferred embodiment.
Figure 4:
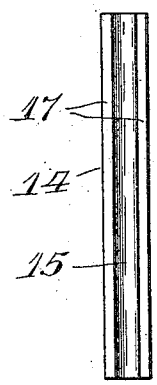
Figs. 4, 5 and 6 are similar views of a modified form of key.
Figure 5:
Figure 3:
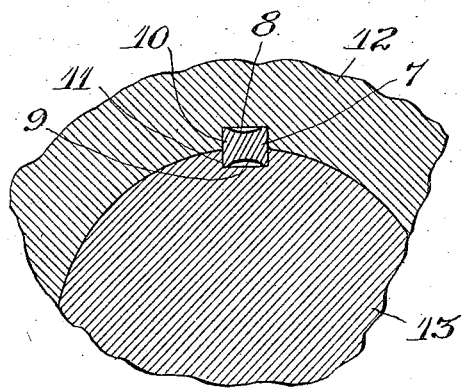
Fig. 3 is a section of a part of a hub and shaft secured together thereby.
Figure 6:
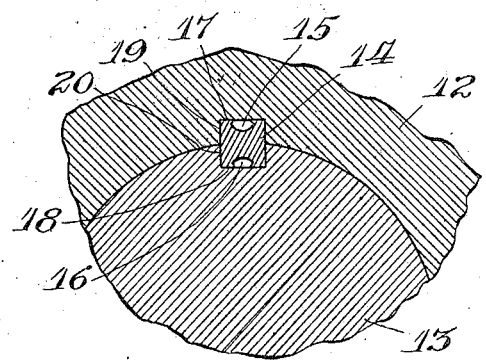

The key 14 shown in Figs. 4, 5 and 6 is similar to the form just described except that the longitudinal grooves 15, 16 are relatively narrower and deeper than the grooves 8, 9 thereby providing wider bearing surfaces 17, 18 at the corners of the key. The thickness of the key 14 is slightly greater than the depth of the keyway 19, 20 so that when it is driven in the metal adjacent the grooves will be displaced or flow slightly under pressure into the grooves 15, 16.

While I have described my key as being made of soft metal, it is to be understood that the term "soft" is used only relatively and that any metal soft enough to flow or deform without breaking the hubs may be used. In practice I have found a commercial grade of mild or soft machine steel to be most suitable but other metals or grades of steel may be used if desired.

It will be apparent to those skilled in the art that I have provided a machine key which may be quickly inserted and that will have a perfect bearing in the corners of the keyway without being carefully fitted by skilled workmen.

What I claim as new and desire to secure by Letters Patent is:

1. As an article of manufacture, a machine key made from relatively soft metal having longitudinal grooves on opposite sides thereby providing deformable portions adapted to be displaced into the grooves when the key is inserted in a keyway of less dimension than the key.

2. As an article of manufacture, a machine key made from ductile metal substantially rectangular in cross section and having shallow grooves on opposite sides extending longitudinally of the key and substantially the entire width whereby the corners of the key will flow into the grooves when the key is driven into a key way of less depth than the thickness of the key.

In testimony whereof I affix my signature.

BERT R. BENJAMIN.